(12) United States Patent
Lucas

(10) Patent No.: US 10,218,014 B2
(45) Date of Patent: Feb. 26, 2019

(54) ANODE-CATHODE SUPPLY DEVICE

(71) Applicant: Volkswagen AG, Wolfsburg (DE)

(72) Inventor: Christian Lucas, Braunschweig (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 194 days.

(21) Appl. No.: 15/248,023

(22) Filed: Aug. 26, 2016

(65) Prior Publication Data

US 2017/0062850 A1    Mar. 2, 2017

(30) Foreign Application Priority Data

Aug. 26, 2015    (DE) .................. 10 2015 216 343

(51) Int. Cl.
*H01M 8/00*        (2016.01)
*H01M 8/04082*     (2016.01)
(Continued)

(52) U.S. Cl.
CPC ..... *H01M 8/04201* (2013.01); *B60L 11/1883* (2013.01); *B60L 11/1898* (2013.01); *H01M 8/04089* (2013.01); *H01M 8/04104* (2013.01); *H01M 8/04228* (2016.02); *H01M 8/04303* (2016.02); *H01M 8/04432* (2013.01); *H01M 8/04753* (2013.01); *H01M 8/04231* (2013.01); *H01M 2008/1095* (2013.01); *H01M 2250/20* (2013.01); *Y02T 90/32* (2013.01)

(58) Field of Classification Search
CPC ......... H01M 8/04201; H01M 8/04753; H01M 8/04228; H01M 8/04231; B60L 11/1883
See application file for complete search history.

(56) References Cited

U.S. PATENT DOCUMENTS 7,767,352 B2    8/2010  Wake et al.
2010/0266915 A1*  10/2010  Orihashi .......... H01M 8/04104
                                                        429/429
(Continued)

FOREIGN PATENT DOCUMENTS

DE          10041125         4/2002
DE      102006 035851 B4     2/2007
DE        102012218555       4/2013

*Primary Examiner* — Cynthia H Kelly
*Assistant Examiner* — Monique M Wills
(74) *Attorney, Agent, or Firm* — Davidson, Davidson & Kappel, LLC

(57) ABSTRACT

An anode-cathode supply device for a fuel cell of a fuel cell system, including an anode supply system and a cathode supply system, which may be brought into a fluid communication with each other with the aid of an overflow line situated therebetween and through an overflow valve, the overflow valve being designed as an NC overflow valve, the NC overflow valve being closed in a de-energized state of the NC overflow valve and at a balanced pressure ratio at the NC overflow valve is provided. A method for supplying an operating medium or a device for supplying an operating medium, in particular hydrogen, from an anode to a cathode of a fuel cell of a fuel cell system, preferably a vehicle, in particular an electric vehicle, chronologically during and/or after the fuel cell is deactivated is also provided. A fuel cell system for a vehicle, in particular an electric vehicle, or to a vehicle, in particular an electric vehicle is also provided.

17 Claims, 4 Drawing Sheets

(51) Int. Cl.
*H01M 8/04746* (2016.01)
*H01M 8/04228* (2016.01)
*B60L 11/18* (2006.01)
*H01M 8/04089* (2016.01)
*H01M 8/0438* (2016.01)
*H01M 8/04303* (2016.01)
*H01M 8/04223* (2016.01)
*H01M 8/1018* (2016.01)

(56) References Cited

U.S. PATENT DOCUMENTS

2012/0276460 A1 11/2012 Kumei et al.
2013/0095403 A1 4/2013 Koga
2014/0167494 A1* 6/2014 Jeon ..................... B60T 7/042
303/10

* cited by examiner

ANODE-CATHODE SUPPLY DEVICE

This claims the benefit of German Patent Application DE102015216343.1, filed Aug. 26, 2016 and hereby incorporated by reference herein.

The present invention relates to an anode-cathode supply device for a fuel cell of a fuel cell system of a vehicle, in particular an electric vehicle. The present invention also relates to a method for supplying an operating medium or a device for supplying an operating medium, in particular hydrogen, from an anode to a cathode of a fuel cell of a fuel cell system, preferably a vehicle, in particular an electric vehicle, chronologically during and/or after the fuel cell is deactivated. The present invention furthermore relates to a fuel cell system for a vehicle, in particular an electric vehicle, or to a vehicle, in particular an electric vehicle.

BACKGROUND

A fuel cell uses a chemical conversion of a fuel into water with the aid of oxygen to generate electrical energy. For this purpose, the fuel cell includes at least one so-called membrane electrode assembly (MEA) as a core component, which is an assembly of an ion-conducting, often proton-conducting, membrane and electrodes, an anode and a cathode, situated on both sides of the membrane. In addition, gas diffusion layers (GDL) may be situated on both sides of the membrane electrode assembly, on the sides of the electrodes facing away from the membrane.

The fuel cell is generally formed from a large number of membrane electrode assemblies arranged in a stack, their electrical powers adding up during an operation of the fuel cell. Bipolar plates, also referred to as flow field plates, are generally situated between the individual membrane electrode assemblies and ensure a supply of operating media, so-called reactants, to membrane electrode assemblies, i.e., the individual cells of the fuel cell and are usually also used for cooling. In addition, the bipolar plates ensure an electrically conductive contact with the membrane electrode assemblies.

During an operation of an individual cell, the fuel, a so-called anode operating medium, in particular hydrogen ($H_2$) or a hydrogen-containing gas mixture, is supplied via a flow field of the bipolar plate, which is open on the anode side, to the anode, where an electrochemical oxidation of $H_2$ to $2H^+$ takes place with the discharge of electrons ($2e^-$). A water-bound or water-free transfer of protons ($H^+$) from an anode space into a cathode space takes place through a membrane or an electrolyte, which separates and electrically insulates the reaction spaces from each other in a gas-tight manner. The electrons provided at the anode are supplied to the cathode via an electric line and an electric consumer (electric motor).

A so-called cathode operating medium, in particular an oxygen ($O_2$) or an oxygen-containing gas mixture, for example air, is supplied to the cathode via a flow field of the bipolar plates, which is open on the cathode side, so that a reduction from $O_2$ to $2O^{2-}$ takes place with the absorption of the electrons. At the same time, oxygen anions ($O^{2-}$) formed in the cathode space react with the protons transferred through the membrane, forming water.

To supply a fuel cell stack, hereinafter also referred to mainly as a fuel cell, with operating media, the fuel cell stack includes an anode supply system, on the one hand, and a cathode supply system, on the other hand. The anode supply system has an anode supply path for supplying the anode operating medium into the anode spaces of the fuel cell and an anode exhaust gas path for discharging an anode exhaust gas out of the anode spaces. Similarly, the cathode supply system has a cathode supply path for supplying the cathode operating medium into the cathode spaces of the fuel cell and a cathode exhaust gas path for discharging a cathode exhaust gas out of the cathode spaces.

The explanations below refer to the prior art illustrated in FIGS. 2 and 3. In cathode supply system 30, the cathode of fuel cell 10 may be fluid-mechanically separated from surroundings 2 with the aid of a shutoff valve 310 in cathode supply path 31 and with the aid of a shutoff valve 320 in cathode exhaust gas path 32. Anode supply system 20 and cathode supply system 30 are furthermore fluid-mechanically connectable with the aid of a purge valve and a separator valve in corresponding lines between anode supply system 20 and cathode supply system 30.

In FIG. 2, separator valve 401 is designed as an NO (normally open) overflow valve 401, i.e., an overflow valve which is open when it is not being energized or activated, i.e., for example, when the fuel cell is deactivated, to avoid a critical overpressure or a critical pressure difference between the anode and the cathode of fuel cell 10 when fuel cell system 1 is deactivated. In addition, hydrogen is supplied to the cathode with the aid of NO overflow valve 401 to protect it against harmful air-air startups of fuel cell 10.

Another option according to the prior art for avoiding a critical overpressure is to design drain valve 401 as an NO overflow valve 401, which is illustrated in FIG. 3, and to facilitate a pressure compensation and a supply of hydrogen to the cathode via NO overflow valve 401. The problem with these two approaches is that hydrogen is not homogeneously distributed between the anode and the cathode in the fluid-mechanically blocked part of the fuel cell during and after a deactivation of the fuel cell, since a flow of the hydrogen takes place almost exclusively via the corresponding open valve and not via the membrane of the fuel cell.

DE 10 2006 035 851 B4 discloses a fuel cell system, which includes an anode supply path and a cathode supply path for supplying hydrogen and air to a fuel cell. The fuel cell system furthermore includes an anode exhaust gas path and a cathode exhaust gas path. The cathode supply path may be brought into fluid communication with the anode supply path via a line and an air supply valve situated in the line. The air supply valve is opened for an anode purging process, so that cathode-side air may enter on an anode side of the fuel cell. If an anode purging process does not take place, the air supply valve is closed, independent of pressure.

SUMMARY OF THE INVENTION

It is an object of the present invention to safely operate a fuel cell of a fuel cell system without the fuel cell tending toward air-air startups. It should be possible to carry this out with the aid of simple means, hydrogen being homogeneously distributed between an anode and a cathode in a fluid-mechanically blocked part of the fuel cell during and after the fuel cell is deactivated. No critical pressure differences should occur between the anode and the cathode.

With the aid of an anode-cathode supply device for a fuel cell of a fuel cell system, the object of the present invention is preferably achieved by a method for supplying an operating medium with the aid of a fuel cell system for a vehicle, in particular an electric vehicle, and or with the aid of a vehicle, in particular an electric vehicle, according to the independent claims.

The anode-cathode supply device according to the present invention includes an anode supply system and a cathode supply system, which may be brought into fluid communication with each other with the aid of an overflow line situated therebetween and through an overflow valve, and the overflow valve is designed as an NC overflow valve, the NC overflow valve being closed in a de-energized, i.e., deactivated, state of the NC overflow valve and at a balanced pressure ratio at the NC overflow valve. The term "NC overflow valve" or "NC valve" designates a valve in the normally closed state.

This preferably also means that the NC overflow valve closes (closing pressure difference) and/or is closed at a pressure difference present at the NC overflow valve which is (far) below (uncritical pressure difference) a critical pressure difference for the fuel cell between the anode supply system and the cathode supply system. The fuel cell itself is deactivated or about to be deactivated. The overflow valve is furthermore situated at or in the overflow line.

In exemplary embodiments, the NC overflow valve is designed in such a way that the NC overflow valve opens at a pressure difference at the NC overflow valve (opening pressure difference) which is below or slightly below a critical pressure difference for the fuel cell between the anode supply system and the cathode supply system. In exemplary embodiments, the (uncritical) pressure difference at which the NC overflow valve opens at the earliest (opening pressure difference) is approximately 97.5%, approximately 95%, approximately 92.5%, approximately 90%, approximately 85%, approximately 80%, approximately 75%, approximately 70%, approximately 65%, approximately 60% or approximately 50%±1-2% of the critical pressure difference.

The closing pressure difference is preferably slightly lower in each case, i.e., the opening pressure difference of the overflow valve is slightly higher or equal to the closing pressure difference of the overflow valve. The critical pressure difference is generally higher or slightly higher than the opening pressure difference (opening overpressure), which, in turn, is slightly higher or essentially equal to the closing pressure difference (closing overpressure), the closing pressure difference being able to drop to zero (fluid overpressure at the cathode or no fluid overpressure) and below (fluid overpressure at the anode).

In exemplary embodiments, the NC overflow valve is designed in such a way that the NC overflow valve opens at an anode-side fluid pressure which is above a cathode-side fluid pressure, a pressure difference between the anode-side fluid pressure and the cathode-side fluid pressure being below or slightly below the critical pressure difference for the fuel cell.

This means that, when the pressure difference (opening pressure difference) at the NC overflow valve approaches the critical pressure difference, fluid flows through the overflow line and the overflow valve from the anode supply system to the cathode supply system, and an at least partial pressure compensation is established. An uncritical pressure difference achieved thereby at the fuel cell, or the closing pressure difference between the anode supply system and the cathode supply system, is preferably far below the critical pressure difference for the fuel cell. Once again, the aforementioned values may be used for the uncritical pressure difference or the closing pressure difference, for example 75% of the critical pressure difference, between the anode supply system and the cathode supply system.

In exemplary embodiments, the overflow line is furthermore designed as a separator line, a purge line or another type of line, the overflow line opening into the anode supply system and the cathode supply system. An overflow line of this type may also be referred to as an outflow line. In exemplary embodiments, the overflow line is furthermore provided in such a way that it opens into the cathode supply line within an area which is fluid-mechanically isolatable from its surroundings, the overflow line opening either into a supply path of the cathode supply system or an exhaust gas path of the cathode supply system. The cathode of the fuel cell is fluid-mechanically isolatable from the surroundings, for example with the aid of two actuators, in particular two shutoff valves, of the cathode supply system.

The anode supply system and the cathode supply system are also preferably able to be brought into fluid communication with each other with the aid of a fluid line situated therebetween and through a valve. The valve is preferably designed as an NC valve, the NC valve being closed in a de-energized, i.e., de-activated, state of the NC valve and at a balanced pressure ratio at the NC valve. In particular, a closing force of the NC valve is higher than a closing force of the NC overflow valve.

It is required that the NC valve and the NC overflow valve are comparable to each other, which applies, in particular, to the participating valve seat diameter, through-flow cross sections, etc. If this is not the case, a corresponding conversion must be carried out to make the two valves comparable. This preferably also means that the NC valve closes and/or is closed at a pressure difference present at the NC valve which is above the critical pressure difference for the fuel cell between the anode supply system and the cathode supply system.

The fluid line or the NC valve and the overflow valve or the NC overflow valve are preferably connected in parallel. The valve may furthermore be situated at or in the fluid line. If the overflow line is designed, for example, as a separator line, the fluid line may be designed as a purge line. Conversely, the fluid line may be designed, for example, as a separator line if the overflow line is designed as a purge line. Another type of fluid line between the anode supply system and the cathode supply system may, of course, also be used for the fluid line or the overflow line.

In exemplary embodiments, the NC overflow valve is designed in such a way that, at a lower fluid pressure on the cathode side, a valve member of the NC overflow valve may be pulled away or pressed away from its valve seat in the NC overflow valve, apart from another force acting upon the valve member. If there is a lower fluid pressure on the anode side, the valve member may be pulled or pressed toward its valve seat, apart from another force acting upon the valve member. The NC valve is preferably designed in such a way that the valve member may be directly or indirectly moved or activated by an electromagnet.

The valve member is preferably mechanically pretensioned in the direction of its valve seat, i.e., in particular in the direction of the anode-side fluid pressure, with the aid of an energy store in particular a (spiral) compression spring. This means that, to open the valve member, the anode-side fluid pressure must compensate not only for the cathode-side fluid pressure but also for a force from the energy store (fluid overpressure, pressure difference). An anode-side pressure, above which the NC overflow valve opens and thus establishes the fluid communication between the anode and the cathode, is adjustable (with respect to the cathode) with the aid of the energy store. The anode-side fluid overpressure may not exceed the critical pressure difference, or it must correspond to an uncritical pressure difference (opening overpressure approximately corresponds to closing overpressure).

In the method according to the present invention for supplying an operating medium or with the aid of the device according to the present invention for supplying an operating medium, in particular hydrogen, from an anode to a cathode of a fuel cell of a fuel cell system, preferably of a vehicle, in particular an electric vehicle, chronologically during and/or after the fuel cell is deactivated, for example a fluid communication through an overflow line between an anode supply system and a cathode supply system of the fuel cell system is actively essentially completely prevented or preventable, the fluid communication between the anode supply system and the cathode supply system taking place passively essentially exclusively through a membrane of the fuel cell.

In this case, "active" is understood to mean that an actuating means, in particular a valve, automatically closes and thus fluid-mechanically blocks the overflow line. The anode supply system and the cathode supply system furthermore form an anode-cathode supply device. The fluid communication may be prevented by an NC overflow valve situated in/at the overflow line. In this case, the NC overflow valve automatically closes in a de-energized, i.e., deactivated, state of the NC overflow valve and at a closing pressure difference present at the NC overflow valve. The closing pressure difference is below or slightly below a critical pressure difference for the fuel cell.

This also means that the NC overflow valve is closed in the de-energized state of the NC overflow valve and at a balanced pressure ratio at the NC overflow valve. In this case, the statements made above on the uncritical and/or critical pressure difference as well as the opening pressure difference (opening overpressure) and/or closing pressure difference (closing overpressure) at the NC overflow valve are also applicable. In exemplary embodiments, the overflow line is provided in an anode-cathode supply device according to the present invention.

According to the present invention, a combination of a function of an automatic NC overflow valve and a preexisting valve (purge valve, separator valve, etc.) in the fuel cell system results; this means that no additional valve, corresponding connections and possibly lines are necessary therefor. An NO valve between the anode and the cathode may be advantageously dispensed with. Due to the present invention, a homogeneous distribution of hydrogen in a fluid-mechanically blocked part of the deactivated fuel cell results between an anode and a cathode, with no critical pressure differences between the anode and the cathode being able to occur. Problematic air-air startups of the fuel cell are furthermore effectively avoided.

The fuel cell system according to the present invention or a vehicle according to the present invention has an anode-cathode supply device according to the present invention, and/or a method according to the present invention for supplying an operating medium may be carried out with the aid of the fuel cell system according to the present invention or the vehicle according to the present invention. The fuel cell system or the vehicle may furthermore include a device according to the present invention for supplying the operating medium.

The present invention is explained in greater detail below on the basis of exemplary embodiments with reference to the appended schematic drawing. Elements, parts, or components that have an identical, univocal or analog design and/or function are provided with the same reference numerals in the description of the figures, the list of reference numerals and the patent claims and/or are identified by the same reference numerals in the figures of the drawing. Possible alternatives which are not explained in the description, not illustrated in the drawing and/or are not conclusive, static and/or kinematic inversions, components, etc. of the explained exemplary embodiments of the present invention or individual assemblies, parts of sections thereof may be derived from the list of reference numerals.

BRIEF DESCRIPTION OF THE DRAWINGS

All explained features, including those in the list of reference numerals, are applicable not only in the specified combination or the specified combinations but also in another combination or in other combinations or alone. In particular, it is possible to replace one feature or a plurality of features in the description of the present invention and/or the figure description on the basis of the reference numerals and the features assigned thereto in the description of the present invention, the description of the figures and/or the list of reference numerals. As a result, one feature or a plurality of features may also be interpreted, specified in greater detail and/or substituted in the patent claims.

DETAILED DESCRIPTION

Figure 1:
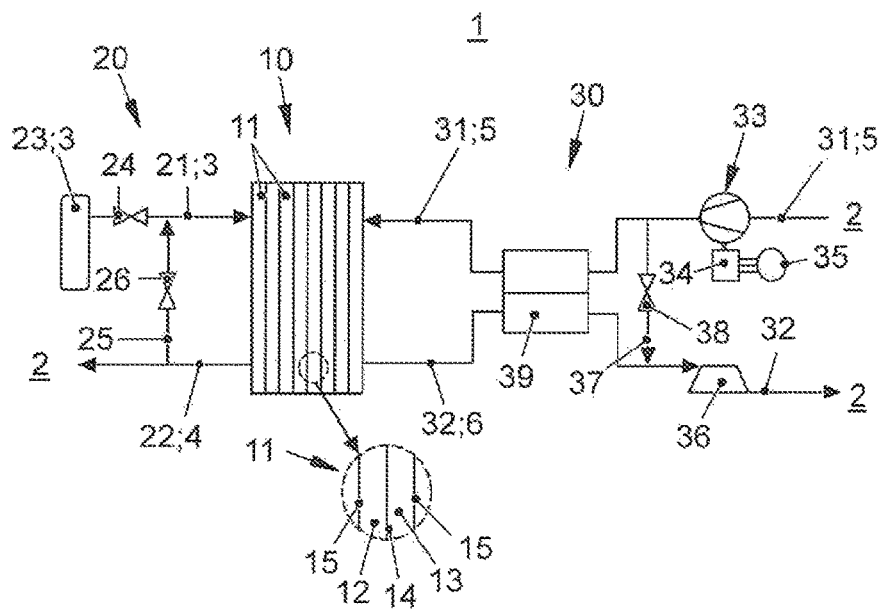
FIG. 1 shows a simplified block diagram of one preferred specific embodiment of a fuel cell system according to the present invention.
Figure 2:
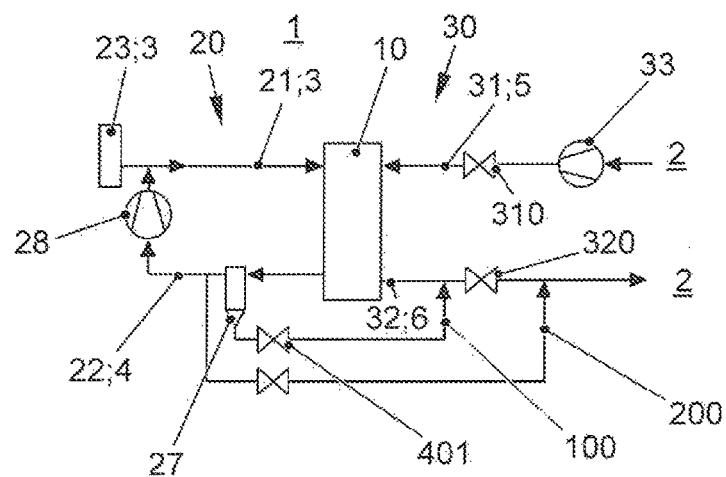
FIG. 2 shows a highly simplified block diagram of an anode-cathode supply device for a fuel cell according to the prior art, including a separator line as an overflow line.
Figure 3:
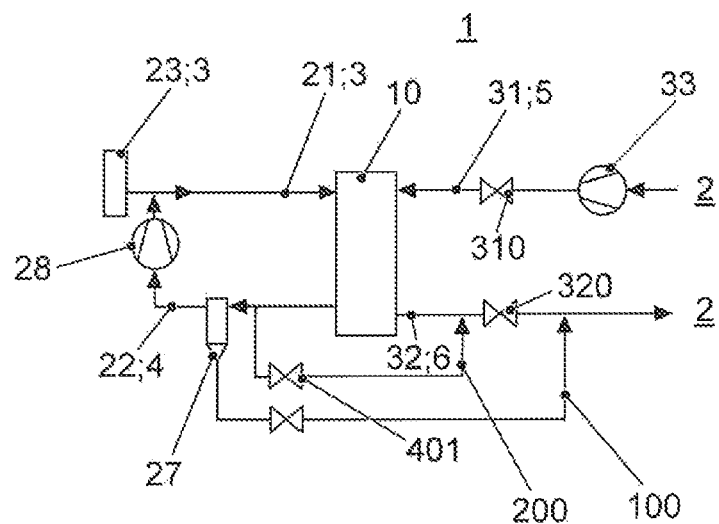
FIG. 3 shows a highly simplified block diagram of an anode-cathode supply device according to the prior art, including a purge line as an overflow line.
Figure 4:
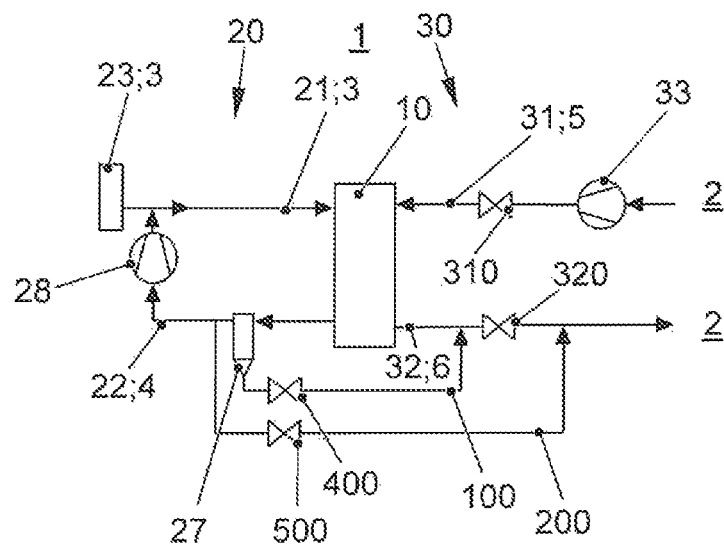
FIG. 4 shows a highly simplified block diagram of a first specific embodiment of an anode-cathode supply device according to the present invention for a fuel cell, including a separator line as an overflow line.
Figure 5:
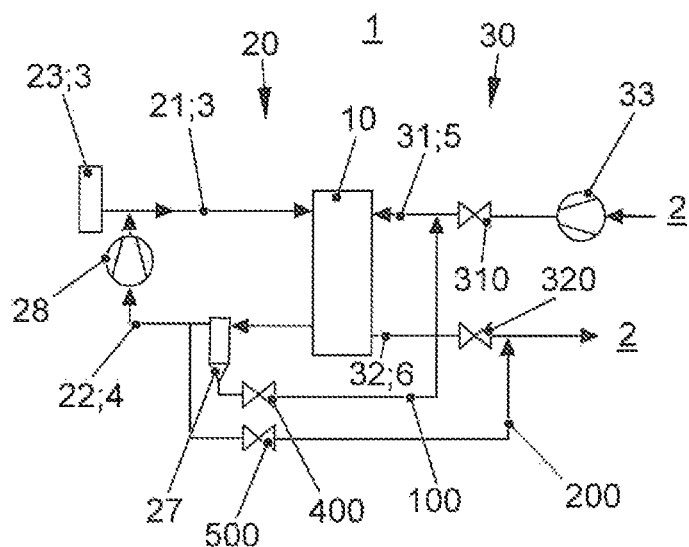
FIG. 5 shows a highly simplified block diagram of a second specific embodiment of an anode-cathode supply device according to the present invention, again including a separator line as an overflow line.
Figure 6:
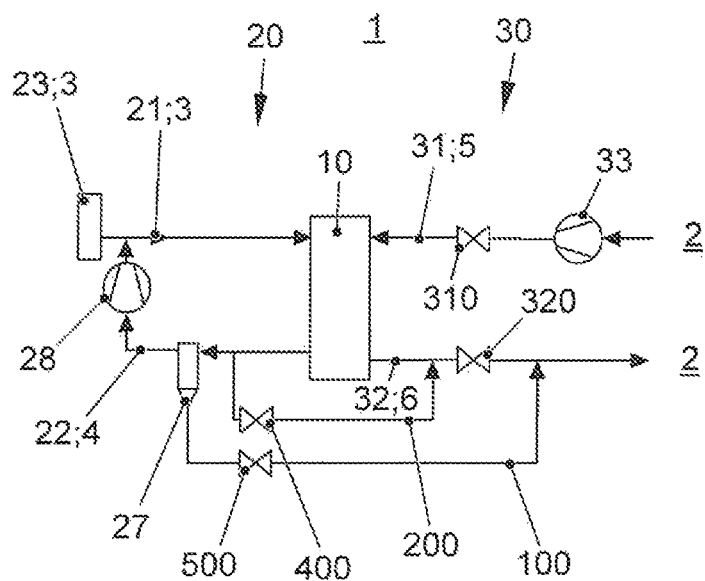
FIG. 6 shows a highly simplified block diagram of a third specific embodiment of an anode-cathode supply device according to the present invention, including a purge line as an overflow line.
Figure 7:
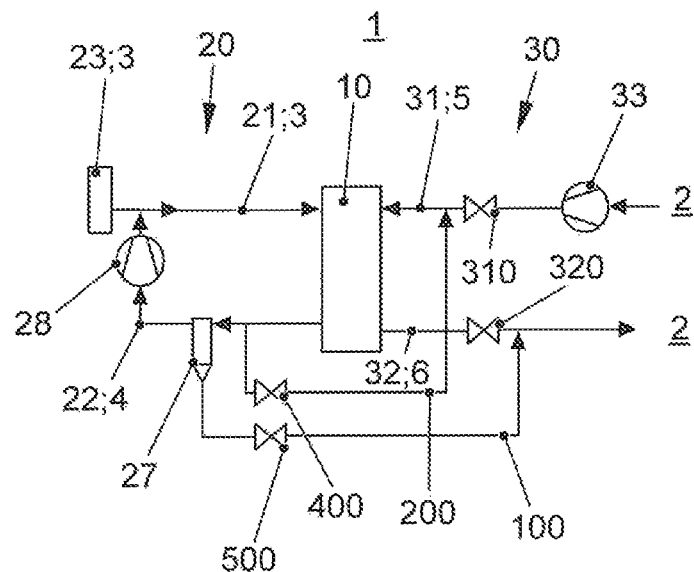
FIG. 7 shows a highly simplified block diagram of a fourth specific embodiment of an anode-cathode supply device according to the present invention, again including a purge line as an overflow line.

The present invention is explained in greater detail on the basis of four specific embodiments of an anode-cathode supply device 20, 30 for a fuel cell 10 of a fuel cell system 1 for a vehicle. The present invention is also explained in greater detail on the basis of a method for supplying an operating medium 3 or on the basis of a device 20, 30 for supplying an operating medium 3, in particular hydrogen 3, from an anode to a cathode of fuel cell 10 chronologically during and/or after fuel cell 10 is deactivated.

However, the present invention is not limited to such specific embodiments and/or the exemplary embodiments explained below, but is more general in nature, so that it is applicable to all anode-cathode supply devices as well as method for supplying an operating medium or devices for supplying an operating medium, for example for stationary fuel cell systems. Although the present invention is described in greater detail and illustrated with the aid of preferred exemplary embodiments, the present invention is not limited by the disclosed exemplary embodiments. Other variations may be derived therefrom without departing from the scope of protection of the present invention.

FIG. 1 shows a fuel cell system 1 according to one preferred specific embodiment of the present invention. Fuel cell system 1 is preferably part of a vehicle, which is not illustrated in greater detail, in particular a motor vehicle or an electric vehicle, which preferably includes an electric traction motor, which is suppliable with electrical energy by fuel cell system 1.

Fuel cell system 1 includes a fuel cell 10 or a fuel cell stack 10 as a core component, which has a large number of fuel cells (herein after referred to as individual cells 11) arranged in the form of a stack. Each individual cell 11 includes an anode space 12 and a cathode space 13, which are preferably spatially and electrically separated from each other by an ion-conductive polymer electrolyte membrane 14 (see detail from FIG. 1). Fuel cell stack 10 is also referred to simply as fuel cell 10.

Anode spaces 12 and cathode spaces 13 each include a catalytic electrode (both not illustrated), i.e., an anode and a cathode, which each catalyze a partial reaction of a fuel cell conversion. The anode electrode and cathode electrode each include a catalytic material, for example platinum, which is supported on an electrically conductive carrier material having a large specific surface, for example a carbon-based material.

An arrangement of a membrane 14 and electrodes is also referred to as a membrane electrode assembly 11. An indicated bipolar plate 15 is furthermore situated between two membrane electrode assemblies 11 of this type, which is used to supply operating media into anode spaces 12 and cathode spaces 13 and which also establishes an electrical connection between individual cells 11.

To supply fuel cell stack 10 or fuel cell 10 with operating media 3, 5, fuel cell system 1 includes an anode supply system 20, on the one hand, and a cathode supply system 30, on the other hand.

Anode supply system 20 includes an anode supply path 21, which is used for supplying an anode operating medium 3, a fuel 3, for example hydrogen 3, or a hydrogen-containing gas mixture 3, into anode spaces 12 of fuel cell stack 10. For this purpose, anode supply path 21 connects a fuel storage 23 or fuel tank 23 to an anode inlet of fuel cell 10. Anode supply system 20 furthermore includes an anode exhaust gas path 22, which discharges an anode exhaust gas 4 out of anode spaces 12 via an anode outlet of fuel cell 10. An anode operating pressure built up on the anode sides of fuel cell 10 is preferably adjustable with the aid of an actuating means 24 in anode supply path 21.

Anode supply system 20 furthermore preferably includes a fuel recirculation line 25, which fluid-mechanically connects anode exhaust gas path 22 to anode supply path 21. A recirculation of anode operating medium 3, i.e., the actually preferred fuel to be filled, is often configured to feed the usually hyperstoichiometrically used anode operating medium 3 back to fuel cell 10. Another actuating means 26 is preferably situated in fuel recirculation line 25, with the aid of which a recirculation rate is adjustable. Additionally or alternatively, a compressor 28 may be provided in fuel recirculation line 25 (see FIGS. 4 through 7).

Cathode supply system 30 includes a cathode supply path 31, which supplies cathode spaces 13 of fuel cell stack 10 with an oxygenated cathode operating medium 5, preferably air 5, which is aspirated, in particular, from surroundings 2. Cathode supply system 30 furthermore includes a cathode exhaust gas path 32, which discharges a cathode exhaust gas 6, in particular exhaust air 6, out of cathode spaces 13 of fuel cell 10 and, if necessary, supplies it to an exhaust gas system.

A compressor 33 is preferably situated in cathode supply path 31 for the purpose of conveying and compressing cathode operating medium 5. In the illustrated specific embodiment, compressor 33 is designed as a possibly mainly electromotively driven compressor 33, whose driving action takes place with the aid of an electric motor 34 or a drive 34, which is preferably equipped with corresponding power electronics 35. Compressor 33 is preferably designed as an electric turbocharger (ETC). Compressor 33 may furthermore be driven in a supporting manner by a turbine 36 having a possibly variable turbine geometry, situated in cathode exhaust gas path 32, via a shared shaft. Turbine 36 represents an expander which effectuates an expansion of cathode exhaust gas 6 and thus a reduction of its fluid pressure.

According to the illustrated specific embodiment, cathode supply system 30 may furthermore include a waste gate 37 or a waste gate line 37, which connects cathode supply path 31 or a cathode supply line to cathode exhaust gas path 32 or a cathode exhaust gas line, i.e., a bypass for fuel cell 10. Waste gate 37 makes it possible to temporarily reduce an operating pressure of cathode operating medium 5 in fuel cell 10, without shutting down compressor 33. An actuating means 38 situated in waste gate 37 permits an adjustment of a volume flow of cathode operating medium 5 bypassing fuel cell 10.

All actuating means 24, 26, 38, 310, 320, 400 (see below) of fuel cell system 1 may be designed as regulatable, controllable or non-regulatable valves, flaps, throttle valves, etc. To further isolate (see FIGS. 4 through 7) fuel cell 10 from surroundings 2, at least one additional corresponding actuating means 310, 320 may be situated in a path 21, 22, 31, 32 or a line of path 21, 22, 31, 32.

Preferred fuel cell system 1 furthermore includes a humidifier module 39. Humidifier module 39 is situated, on the one hand, in cathode supply path 31 in such a way that cathode operating medium 5 may flow through it. On the other hand, humidifier module 39 is situated in cathode exhaust gas path 32 in such a way that cathode exhaust gas 6 may flow through it. Humidifier module 39 is preferably situated, on the one hand, in cathode supply path 31 between compressor 33 and a cathode input and, on the other hand, in cathode exhaust gas path 32 between turbine 36 and a cathode output of fuel cell 10. A humidifier of humidifier module 39 typically includes a plurality of water vapor-permeable membranes, which are often designed to be either planar or in the form of hollow fibers.

Various additional details of fuel cell system 1 or fuel cell 10/fuel cell stack 10, anode supply system 20 and cathode supply system 30 are not illustrated in the simplified FIG. 1 for the sake of clarity. Humidifier module 39 may thus be bypassed on the side of cathode supply path 31 as well as on the side of cathode exhaust gas path 32 with the aid of a bypass line. A turbine bypass line may also be provided on the side of cathode exhaust gas path 32, which bypasses turbine 36.

A water separator 27 may furthermore be installed in anode exhaust gas path 22 and/or in cathode exhaust gas path 32 (illustrated for anode exhaust gas path 22 in FIGS.

4 through 7), with the aid of which a product water resulting from the applicable partial reaction of fuel cell 10 may be condensed and/or separated and diverted to a water collecting tank. Alternatively or additionally, anode supply system 20 may also include a humidifier module similar to cathode supply system 30. Anode exhaust gas path 22 may furthermore open into cathode exhaust gas path 32 (see FIGS. 4 through 7) or vice versa, so that anode exhaust gas 4 and cathode exhaust gas 6 may be discharged via a shared exhaust gas system.

When fuel cell 10 is deactivated, the cathode or the cathode spaces are isolated from surroundings 2 with the aid of actuating means 310, 320, in particular shutoff valves 310, 320, in cathode supply path 31 and in cathode exhaust gas path 32. During and after the isolation, the anode or the anode spaces have a higher fluid pressure than the cathode or cathode spaces. Anode supply system 20 and cathode supply system 30 are furthermore fluid-mechanically connectable with the aid of a separator line 100 and/or a purge line 200. Separator line 100 preferably extends from water separator 27 of anode supply system 20 to cathode supply system 30. Purge line 200 also extends from anode supply system 20 to cathode supply system 30.

Separator line 100 preferably opens into anode exhaust gas path 22 (FIGS. 4 through 7). Separator line 100 may open upstream from purge line 200 into anode supply system 20 (FIGS. 4 and 5) or downstream (FIGS. 6 and 7) therefrom into anode supply system 20, with respect to a fluid circuit. Separator line 100 may furthermore open into a fluid-mechanically blockable part of cathode supply system 30 in cathode exhaust gas path 32, i.e., upstream from shutoff valve 320 (FIG. 4) (designed to be open) or in cathode supply path 31, i.e., downstream from shutoff valve 310 (FIG. 5) (designed to be open). In addition, separator line 100 may open downstream from the fluid-mechanically blockable part of cathode supply system 30, i.e., downstream from shutoff valve 320 (FIGS. 6 and 7) into cathode exhaust gas path 32.

Purge line 200 preferably also opens into anode exhaust gas path 22 (FIGS. 4 through 7). In this case, purge line 200 may open downstream from water separator 27 or separator line 100 into anode supply system 20 (FIGS. 4 and 5) or upstream (FIGS. 6 and 7) therefrom into anode supply system 20, with respect to the fluid circuit. Purge line 200 may furthermore open into the fluid-mechanically blockable part of cathode supply system 30 in cathode exhaust gas path 32, i.e., upstream from shutoff valve 320 (FIG. 6) (designed to be open) or into cathode supply path 31, i.e., downstream from shutoff valve 310 (FIG. 7) (designed to be open). In addition, purge line 200 may open downstream from the fluid-mechanically blockable part of cathode supply system 30, i.e., downstream from shutoff valve 320 (FIGS. 4 and 5) into cathode exhaust gas path 32.

According to the present invention, one of fluid lines 100, 200 between anode supply system 20 and cathode supply system 30 is designed as an overflow line 100, 200. Depending on which of fluid lines 100, 200 is designed as overflow line 100, 200, overflow line 100, 200 may be designed as a separator line 100, a purge line 200, a fluid line, etc. An overflow valve 400 is provided at/in overflow line 100, 200. If overflow valve 400 is provided, for example, at/in separator line 100, overflow valve 400 may be designed as a separator valve 400. However, if overflow valve 400 is provided at/in purge line 200, overflow valve 400 may be designed as a purge valve 400. In the possibly used fluid line, overflow valve 400 is designed as a fluid valve.

According to the present invention, overflow valve 400, with the aid of which a pressure compensation is ensured between the anode and the cathode, is designed as an NC overflow valve 400 designed as an NC valve. NC stands for normally closed; this means that overflow valve 400 is closed when it is de-energized or de-activated. NC overflow valve 400 is furthermore designed in such a way that, when fuel cell 10 is deactivated, a critical overpressure or a critical pressure difference between the anode and the cathode is avoidable, since NC overflow valve 400 opens before this pressure difference is reached and establishes a fluid communication between anode supply system 20 and the blocked part of cathode supply system 30. The cathode is fluid-mechanically separated from surroundings 2 with the aid of shutoff valves 310, 320.

No other direct fluid connection exists, for example via an NO valve for the pressure compensation between the anode and the cathode, as in the prior art. The use of NC overflow valve 400 between the anode and the cathode makes it possible for an anode-side fluid pressure p1 (see FIG. 8) to be above a cathode-side fluid pressure p2 (see FIG. 8) in the turned-off vehicle. A larger volume of hydrogen 3 thus remains in anode supply system 20, compared to the prior art. An anode-side overpressure p1-p2 in fuel cell system 1 will decrease over time via membrane 14 (actually membranes 14) of fuel cell 10 and become evenly distributed in fuel cell stack 10. The air present at the cathode after fuel cell 10 is deactivated is evenly reduced.

NC overflow valve 400 between the anode and the cathode closed by shutoff valves 310, 320 may have different designs and have different positions in anode-cathode supply devices 20, 30, which have different advantages. In particular, NC overflow valve 400 is designed as separator valve 400 or as purge valve 400. NC overflow valve 400 may connect an anode inlet or an anode outlet to a cathode inlet or a cathode outlet.

According to the present invention, NC overflow valve 400 is designed in such a way that NC overflow valve 400 is pushed open, starting at a specific pressure difference at NC overflow valve 400, due to this pressure difference. This pressure difference should be less than a maximum continuously permissible pressure difference between the anode and the cathode. NC overflow valve 400 may be designed in such a way that operating medium 3, i.e., in particular, hydrogen 3, flows against a valve seat 422 of NC overflow valve 400 (see FIG. 8). In NC overflow valve 400, due to the pressure difference at NC overflow valve 400, a compressive force from operating medium 3 acts against an energy store 430 of NC overflow valve 400, which has a permanent tendency to push NC overflow valve 400 closed. If the compressive force, i.e., a pressure difference at NC overflow valve 400, is higher than the force from energy store 430, NC overflow valve 400 is pushed open.

Figure 8:
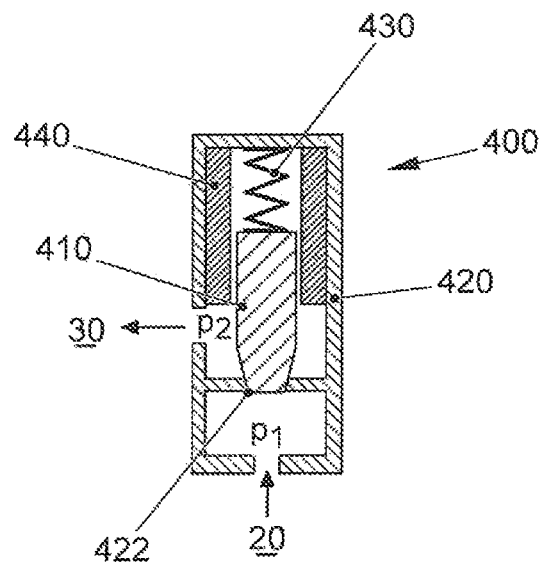
FIG. 8 shows a schematic and central sectional view of an NC overflow valve providable at/in the overflow line.

FIG. 8 shows an example of a usable NC valve concept of this type for NC overflow valve 400 according to the present invention. A valve body 420 and a valve member 410, which is linearly movable therein, are apparent in the sectional view in FIG. 8. Valve member 410 is able to move away from its valve seat 422 in valve body 420 with the aid of an electromagnet 440 accommodated in valve body 420, depending on an activation of electromagnet 440, valve member 410 being supported on energy store 430, in particular a (spiral) compression spring 430, in valve body 420. Other NC valve concepts may, of course, also be used.

Depending on an activation of electromagnet 440, a (compressive) force of energy store 430 and the pressure ratios in anode supply system 20 ($p_1$) and cathode supply system 30 ($p_2$), NC overflow valve 400 is closed, NC overflow valve 400 opens, NC overflow valve 400 is open, NC overflow valve 400 closes or NC overflow valve 400 is closed (operation of fuel cell 10). If electromagnet 440 is not activated, a state of NC overflow valve 400 depends only on the force of energy store 430 and the pressure ratios in anode supply system 20 ($p_1$) as well as cathode supply system 30 ($p_2$) (deactivated state of fuel cell 10, possibly operation of fuel cell 10).

Thus, ($p_1 > p_2$) opens NC overflow valve 400 starting at a certain anode-side, relative fluid (over)pressure $p_1$ with respect to a cathode-side, relative fluid (under)pressure $p_2$, i.e., at a certain pressure difference $p_1 - p_2$ (opening pressure difference, opening overpressure). The force of energy store 430, which opens NC overflow valve 400, is overcome at this pressure difference $p_1 - p_2$ with a given geometry of NC overflow valve 400. In the present case, this pressure difference $p_1 - p_2$ is smaller than the critical pressure difference between the anode and the cathode of fuel cell 10. If anode-side, relative fluid (over)pressure $p_1$ decreases so that certain pressure difference $p_1 - p_2$ (closing pressure difference, closing overpressure) is exceeded, NC overflow valve 400 closes again safely.

In parallel with NC overflow valve 400, a valve 500, which is designed as separator valve 500, purge valve 500, etc., is provided in the particular other fluid line 100, 200 and is preferably also designed as an NC valve 500. A closing force of NC valve 500 is preferably designed to be higher than a closing force of NC overflow valve 400, which, of course, applies only to comparable valves 400, 500. If necessary, a comparable basis must be found for both valves 400, 500 in the case of non-comparable valves 400, 500.

LIST OF REFERENCE NUMERALS 1 fuel cell system, preferably for a vehicle including an electric motor, in particular an electric traction motor
2 surroundings
3 operating medium, reactant, in particular anode operating medium, actual fuel, preferably hydrogen or hydrogen-containing gas mixture
4 exhaust gas including liquid water, in particular anode exhaust gas
5 operating medium, reactant, in particular cathode operating medium, preferably air
6 exhaust gas including liquid water, in particular cathode exhaust gas, preferably exhaust air
7 coolant, in particular water, water-alcohol mixture, water-ethylene glycol mixture
10 fuel cell, fuel cell stack
11 individual cell, including anode and cathode, individual fuel cell
12 anode space
13 cathode space
14 membrane, preferably polymer electrolyte membrane
15 bipolar plate, flow field plate
20 anode supply system, anode circuit of fuel cell 10 or fuel cell stack 10
21 path, supply path, flow path, anode supply path
22 path, exhaust gas path, flow path, anode exhaust gas path
23 fuel storage, fuel tank, including anode operating medium 3
24 actuating means, regulatable, activatable/controllable, not regulatable, in particular valve, flap, throttle valve, etc.
25 fuel recirculation line
26 actuating means, regulatable, activatable/controllable, not regulatable, in particular valve, flap, throttle valve, etc.
27 water separator
28 compressor
30 cathode supply system, cathode circuit of fuel cell 10 or fuel cell stack 10
31 path, supply path, flow path, cathode supply path
32 path, exhaust gas path, flow path, cathode exhaust gas path
33 compressor, turbocharger
34 motor, in particular electric motor or drive (possibly including gear set)
35 electronics, in particular power electronics for motor 34
36 turbine, possibly having a variable turbine geometry, expander
37 waste gate, waste gate line
38 actuating means, regulatable, activatable/controllable, not regulatable, in particular valve, flap, throttle valve, etc.
39 humidifier, humidifier module
100 overflow line, separator line/fluid line
200 overflow line, purge line/fluid line
310 actuating means, regulatable, activatable/controllable, not regulatable, in particular shutoff valve
320 actuating means, regulatable, activatable/controllable, not regulatable, in particular shutoff valve
400 actuating means, regulatable, activatable/controllable, not regulatable, in particular overflow valve, NC overflow valve, preferably designed as a fluid valve, gas valve, separator valve, purge valve
401 NO overflow valve (prior art only)
410 valve member
420 valve body
422 valve seat
430 energy store, in particular (spiral) compression spring
440 electromagnet
500 actuating means, regulatable, activatable/controllable, not regulatable, in particular valve, NC valve
$p_1$ fluid pressure, anode-side fluid pressure, in particular at valve member 410
$p_2$ fluid pressure, cathode-side fluid pressure, in particular at valve member 410

What is claimed is:

1. An anode-cathode supply device for a fuel cell of a fuel cell system, the anode-cathode supply device comprising:
an anode supply system and a cathode supply system and an overflow line connecting the anode supply system and the cathode supply system and bypassing the fuel cell, the overflow line having an overflow valve and the anode supply system and the cathode supply system being in fluid communication via the overflow line when the overflow valve is open,
the overflow valve being an NC overflow valve, the NC overflow valve being closed in a de-energized state of the NC overflow valve and at a balanced pressure ratio at the NC overflow valve.

2. The anode-cathode supply device as recited in claim 1 wherein the NC overflow valve is designed in such a way that the NC overflow valve opens at a pressure difference at the NC overflow valve below a critical pressure difference for the fuel cell between the anode supply system and the cathode supply system.

3. The anode-cathode supply device as recited in claim 1 wherein the NC overflow valve is designed in such a way that the NC overflow valve opens at an anode-side fluid pressure above a cathode-side fluid pressure, a pressure difference between the anode-side fluid pressure and the cathode-side fluid pressure being below the critical pressure difference for the fuel cell.

4. The anode-cathode supply device as recited in claim 1 wherein the overflow line is furthermore designed as a separator line, a purge line or another type of line, the overflow line opening into the anode supply system and the cathode supply system.

5. The anode-cathode supply device as recited in claim 1 wherein the overflow line opens into the cathode supply system within an area of the cathode supply system fluid-mechanically isolatable from surroundings, the overflow line opening either into a supply path of the cathode supply system or an exhaust gas path of the cathode supply system.

6. The anode-cathode supply device as recited in claim 1 wherein the anode supply system and the cathode supply system furthermore are connected with each other with the aid of a further fluid line situated therebetween and through a further valve, the anode supply system and the cathode supply system being in fluid communication via the further fluid line when the further valve is open and the further valve is designed as a further NC valve, the further NC valve being closed in a de-energized state of the further NC valve and at a balanced pressure ratio at the further NC valve.

7. The anode-cathode supply device as recited in claim 6 wherein a closing force of the further NC valve is greater than a closing force of the NC overflow valve.

8. The anode-cathode supply device as recited in claim 1 wherein the NC overflow valve is designed in such a way that, at a lower cathode-side fluid pressure, a valve member of the NC overflow is pullable away from a valve seat in the NC overflow valve, apart from another force acting upon the valve member, or at a lower anode-side fluid pressure, the valve member is pullable onto the valve seat, apart from another force acting upon the valve member.

9. A fuel cell system for a vehicle comprising the anode-cathode supply device as recited in claim 1.

10. A vehicle comprising the anode-cathode supply device as recited in claim 1.

11. An electric vehicle comprising the anode-cathode supply device as recited in claim 1.

12. The anode-cathode supply device as recited in claim 1 wherein the fuel cell is a vehicle fuel cell.

13. The anode-cathode supply device as recited in claim 1 wherein the fuel cell is an electric vehicle fuel cell.

14. The anode-cathode supply device as recited in claim 1 wherein the anode supply system includes a water separator and the overflow line extends from the water separator to the cathode supply system.

15. The anode-cathode supply device as recited in claim 6 wherein the overflow line is a separator line and the further fluid line is a purge line.

16. The anode-cathode supply device as recited in claim 15 wherein the separator line and the purge line open into an anode exhaust gas path of the anode supply system.

17. The anode-cathode supply device as recited in claim 15 wherein the overflow line opens into an anode exhaust gas path of the anode supply system.

* * * * *